D. DEMAREST.
Hitch-Hook for Street Cars.

No. 159,308.

Patented Feb. 2, 1875.

WITNESSES:

INVENTOR:
David Demarest
BY
ATTORNEYS.

UNITED STATES PATENT OFFICE.

DAVID DEMAREST, OF NEW YORK, N. Y.

IMPROVEMENT IN HITCH-HOOKS FOR STREET-CARS.

Specification forming part of Letters Patent No. 159,308, dated February 2, 1875; application filed January 18, 1875.

*To all whom it may concern:*

Figure 1:
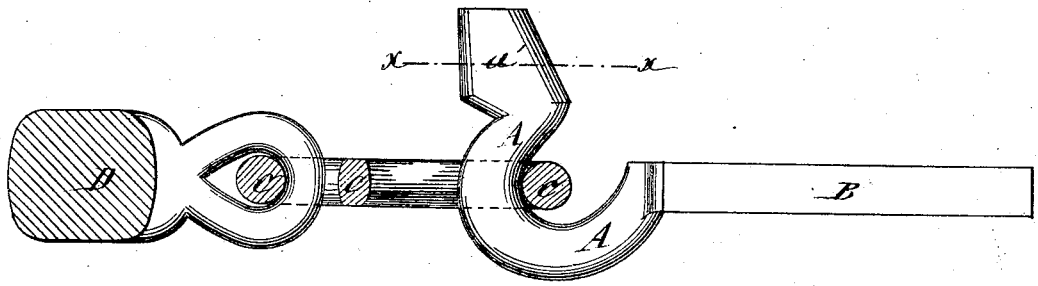
Figure 2:
Figure 3:
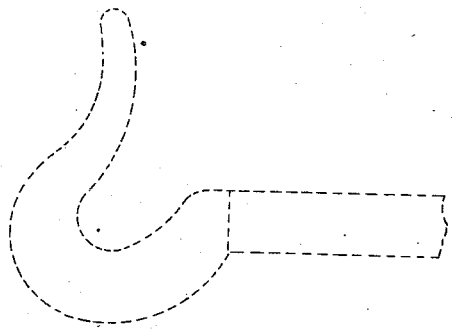

Be it known that I, DAVID DEMAREST, of the city, county, and State of New York, have invented a new and Improved Hitch-Hook for Street-Cars, of which the following is a specification:

Figure 1 is a side view of my improved hitch-hook, the double-tree and connecting-link being shown in section. Fig. 2 is a cross-section of the bill of the hook, taken through the line x x, Fig. 1; and Fig. 3 represents an ordinary hitch-hook in side view.

Similar letters of reference indicate corresponding parts.

My invention has for its object to furnish an improved hitch-hook for street-cars, which shall be so constructed as to prevent the horses from becoming accidentally detached and running away should they become frightened and jump to one side, and which will prevent them from becoming detached when a pole is used and they are held back.

The invention consists in the bill or head formed upon the point of the hitch-hook of street-cars, as hereinafter fully described.

A is the hitch-hook, which is formed upon the forward end of the draw-bar B in the ordinary way. Upon the point of the hook A is formed a bill or head, $a'$, which is made oval in its cross-section, as shown in Fig. 2, and the lower part of which projects forward to form a shoulder, as shown in Fig. 1, to prevent the connecting-link C of the double-tree D, or the eye of the pole-shoe, when a pole is used, from slipping off, or from being raised from said hook when the horses are in any other position than in line with the car. The bill $a'$ is made of such a size that the coupling-link or the eye of the pole-shoe can be readily raised over it when the horses are in line with the car, but which, when the horses are in any other position, will force the side of the link, or the eye of the pole-shoe beneath the shoulder of the said bill, and thus prevent the detachment of the horses.

This invention will prevent the running away of frightened horses that have become accidentally detached from their car, and the injury to persons and vehicles and other objects encountered by the runaway horses, thus removing a source of frequent accidents in the crowded streets of large cities.

Having thus described my invention, I claim as new and desire to secure by Letters Patent—

In hitch-hooks for street-cars, the bill or head $a'$, formed upon the point of the hitch-hook A, substantially as shown and described, and for the purpose set forth.

DAVID DEMAREST.

Witnesses:
JAMES T. GRAHAM,
T. B. MOSHER.